United States Patent [19]

Nelson

[11] Patent Number: 5,038,381
[45] Date of Patent: Aug. 6, 1991

[54] IMAGE/TEXT FILTERING SYSTEM AND METHOD

[75] Inventor: Brett K. Nelson, Campbell, Calif.

[73] Assignee: New DEST Corporation, San Jose, Calif.

[21] Appl. No.: 495,565

[22] Filed: Mar. 19, 1990

Related U.S. Application Data

[63] Continuation of Ser. No. 219,842, Jul. 11, 1988, abandoned, which is a continuation of Ser. No. 740,940, Jun. 3, 1985, abandoned.

[51] Int. Cl.⁵ .............................................. G06K 9/36
[52] U.S. Cl. ..................................... 382/9; 358/261.1; 383/18; 383/28; 383/56
[58] Field of Search .................. 382/9, 51, 48, 56, 16, 382/18, 27; 358/261.1, 470, 464

[56] References Cited

U.S. PATENT DOCUMENTS

| | | | |
|---|---|---|---|
| 3,629,827 | 12/1971 | Johnston | 382/48 |
| 3,805,237 | 4/1974 | Cobb et al. | 382/9 |
| 4,135,148 | 1/1979 | Carlson | 382/48 |
| 4,292,622 | 9/1981 | Henrichon, Jr. | 382/9 |
| 4,411,015 | 10/1983 | Scherl et al. | 358/282 |
| 4,503,556 | 3/1985 | Scherl et al. | 382/9 |
| 4,504,972 | 3/1985 | Scherl et al. | 382/9 |
| 4,513,442 | 4/1985 | Scherl | 352/48 |
| 4,559,644 | 12/1985 | Kataoka et al. | 382/9 |
| 4,577,235 | 3/1986 | Kannapell et al. | 358/282 |
| 4,590,606 | 5/1986 | Rohrer | 382/56 |

Primary Examiner—David K. Moore
Assistant Examiner—Joseph Mancuso
Attorney, Agent, or Firm—Flehr, Hohbach, Test, Albritton & Herbert

[57] ABSTRACT

Image/text filtering apparatus and method for use in optical character recognition (OCR) scanning is disclosed. The invention filters video data representing text and image data on a document and erases the image data so that only the text data remains.

8 Claims, 6 Drawing Sheets

COURIER 72-10 (015) ABCDEFGHIJKLMNOPQRSTUVWXYZ

ABCDEFGHIJKLMNOPQRSTUVWXYZ abcdefghijklmnopqrstuvwxyz 0123456789 []@#$%¢&*()+=?/:;"
BCDEFGHIJKLMNOPQRSTUVWXYZ abcdefghijklmnopqrstuvwxyz 0123456789 []@#$%¢&*()+=?/:;"
CDEFGHIJKLMNOPQRSTUVWXYZ abcdefghijklmnopqrstuvwxyz 0123456789 []@#$%¢&*()+=?/:;"
DEFGHIJKLMNOPQRSTUVWXYZ abcdefghijklmnopqrstuvwxyz 0123456789 []@#$%¢&*()+=?/:;"
EFGHIJKLMNOPQRSTUVWXYZ abcdefghijklmnopqrstuvwxyz 0123456789 []@#$%¢&*()+=?/:;"
FGHIJKLMNOPQRSTUVWXYZ abcdefghijklmnopqrstuvwxyz 0123456789 []@#$%¢&*()+=?/:;"
GHIJKLMNOPQRSTUVWXYZ abcdefghijklmnopqrstuvwxyz 0123456789 []@#$%¢&*()+=?/:;"
HIJKLMNOPQRSTUVWXYZ abcdefghijklmnopqrstuvwxyz 0123456789 []@#$%¢&*()+=?/:;"
IJKLMNOPQRSTUVWXYZ abcdefghijklmnopqrstuvwxyz 0123456789 []@#$%¢&*()+=?/:;"
JKLMNOPQRSTUVWXYZ abcdefghijklmnopqrstuvwxyz 0123456789 []@#$%¢&*()+=?/:;"
KLMNOPQRSTUVWXYZ abcdefghijklmnopqrstuvwxyz 0123456789 []@#$%¢&*()+=?/:;"
LMNOPQRSTUVWXYZ abcdefghijklmnopqrstuvwxyz 0123456789 []@#$%¢&*()+=?/:;"

LETTER GOTHIC (005) ABCDEFGHIJKLMNOPQRSTUVWXYZ

ABCDEFGHIJKLMNOPQRSTUVWXYZ abcdefghijklmnopqrstuvwxyz 0123456789 []@#$%¢&*()+=?/:;"
BCDEFGHIJKLMNOPQRSTUVWXYZ abcdefghijklmnopqrstuvwxyz 0123456789 []@#$%¢&*()+=?/:;"
CDEFGHIJKLMNOPQRSTUVWXYZ abcdefghijklmnopqrstuvwxyz 0123456789 []@#$%¢&*()+=?/:;"
DEFGHIJKLMNOPQRSTUVWXYZ abcdefghijklmnopqrstuvwxyz 0123456789 []@#$%¢&*()+=?/:;"
EFGHIJKLMNOPQRSTUVWXYZ abcdefghijklmnopqrstuvwxyz 0123456789 []@#$%¢&*()+=?/:;"
FGHIJKLMNOPQRSTUVWXYZ abcdefghijklmnopqrstuvwxyz 0123456789 []@#$%¢&*()+=?/:;"
GHIJKLMNOPQRSTUVWXYZ abcdefghijklmnopqrstuvwxyz 0123456789 []@#$%¢&*()+=?/:;"
HIJKLMNOPQRSTUVWXYZ abcdefghijklmnopqrstuvwxyz 0123456789 []@#$%¢&*()+=?/:;"
IJKLMNOPQRSTUVWXYZ abcdefghijklmnopqrstuvwxyz 0123456789 []@#$%¢&*()+=?/:;"
JKLMNOPQRSTUVWXYZ abcdefghijklmnopqrstuvwxyz 0123456789 []@#$%¢&*()+=?/:;"
KLMNOPQRSTUVWXYZ abcdefghijklmnopqrstuvwxyz 0123456789 []@#$%¢&*()+=?/:;"
LMNOPQRSTUVWXYZ abcdefghijklmnopqrstuvwxyz 0123456789 []@#$%¢&*()+=?/:;"

*FIGURE 1A*

ORCB-10 (210) ABCDEFGHIJKLMNOPQRSTUVWXYZ

ABCDEFGHIJKLMNOPQRSTUVWXYZ abcdefghijklmnopqrstuvwxyz 0123456789 []@#$%¢&
BCDEFGHIJKLMNOPQRSTUVWXYZ abcdefghijklmnopqrstuvwxyz 0123456789 []@#$%¢&*
CDEFGHIJKLMNOPQRSTUVWXYZ abcdefghijklmnopqrstuvwxyz 0123456789 []@#$%¢&*(
DEFGHIJKLMNOPQRSTUVWXYZ abcdefghijklmnopqrstuvwxyz 0123456789 []@#$%¢&*()
EFGHIJKLMNOPQRSTUVWXYZ abcdefghijklmnopqrstuvwxyz 0123456789 []@#$%¢&*()+
FGHIJKLMNOPQRSTUVWXYZ abcdefghijklmnopqrstuvwxyz 0123456789 []@#$%¢&*()+=
GHIJKLMNOPQRSTUVWXYZ abcdefghijklmnopqrstuvwxyz 0123456789 []@#$%¢&*()+=?
HIJKLMNOPQRSTUVWXYZ abcdefghijklmnopqrstuvwxyz 0123456789 []@#$%¢&*()+=?/
IJKLMNOPQRSTUVWXYZ abcdefghijklmnopqrstuvwxyz 0123456789 []@#$%¢&*()+=?/:
JKLMNOPQRSTUVWXYZ abcdefghijklmnopqrstuvwxyz 0123456789 []@#$%¢&*()+=?/:;
KLMNOPQRSTUVWXYZ abcdefghijklmnopqrstuvwxyz 0123456789 []@#$%¢&*()+=?/:;'
LMNOPQRSTUVWXYZ abcdefghijklmnopqrstuvwxyz 0123456789 []@#$%¢&*()+=?/:;'"

PRESTIGE ELITE (012) ABCDEFGHIJKLMNOPQRSTUVWXYZ

ABCDEFGHIJKLMNOPQRSTUVWXYZ abcdefghijklmnopqrstuvwxyz 0123456789 []@#$%¢&
BCDEFGHIJKLMNOPQRSTUVWXYZ abcdefghijklmnopqrstuvwxyz 0123456789 []@#$%¢&*
CDEFGHIJKLMNOPQRSTUVWXYZ abcdefghijklmnopqrstuvwxyz 0123456789 []@#$%¢&*(
DEFGHIJKLMNOPQRSTUVWXYZ abcdefghijklmnopqrstuvwxyz 0123456789 []@#$%¢&*()
EFGHIJKLMNOPQRSTUVWXYZ abcdefghijklmnopqrstuvwxyz 0123456789 []@#$%¢&*()+
FGHIJKLMNOPQRSTUVWXYZ abcdefghijklmnopqrstuvwxyz 0123456789 []@#$%¢&*()+=
GHIJKLMNOPQRSTUVWXYZ abcdefghijklmnopqrstuvwxyz 0123456789 []@#$%¢&*()+=?
HIJKLMNOPQRSTUVWXYZ abcdefghijklmnopqrstuvwxyz 0123456789 []@#$%¢&*()+=?/
IJKLMNOPQRSTUVWXYZ abcdefghijklmnopqrstuvwxyz 0123456789 []@#$%¢&*()+=?/:
JKLMNOPQRSTUVWXYZ abcdefghijklmnopqrstuvwxyz 0123456789 []@#$%¢&*()+=?/:;
KLMNOPQRSTUVWXYZ abcdefghijklmnopqrstuvwxyz 0123456789 []@#$%¢&*()+=?/:;'
LMNOPQRSTUVWXYZ abcdefghijklmnopqrstuvwxyz 0123456789 []@#$%¢&*()+=?/:;'"

*FIGURE 1B*

IMAGE/TEXT FILTERING SYSTEM AND METHOD

This is a continuation, of application Ser. No. 219,842 filed 7/11/88 now abandoned, which is a continuation of Ser. No. 740,940 filed 6/3/85 also now abandoned.

MICROFICHE APPENDIX

A microfiche appendix containing 143 frames on 3 cards is included in the specification and is hereafter referred to as Appendix A.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to an image/text filtering system and method for use with optical character recognition (OCR) techniques.

The use of word processors and personal computers in the office automation marketplace has dramatically increased in the past several years. With this growth has come an awareness that optical character recognition (OCR) machines can aid productivity by decreasing the time needed to enter typed documents into word processors, personal computers and databases.

The documents fed into OCR equipment consist mainly of typed text, although image features such as company logos, signatures, editing marks, graphs, and pictures are not unusual. Consequently, it is important that OCR machines be sophisticated enought not to let image features degrade recognition throughput, or even worse, let image features be recognized as, or interfere with, valid text. The present invention provides a hardware/software system to identify and erase image regions from digitized text documents prior to character recognition.

Earlier OCR systems achieve varying success with image filtering by following two different methods. The first approach relies on the fact that text characters are generally separated from adjacent characters and can be easily isolated. Conversely, images usually have comparatively longer strings of contiguous pixels. This is a good technique, but it is computation intensive, especially in systems that have limited memory to devote to video buffers. In addition, the large numbers of image fragments that can be generated by this method must be rejected during the recognition process. Throughput in these systems can fall off dramatically when documents with large numbers of small, isolated image elements are being processed. Then image fragments that have been mistaken for valid text must be edited by the user. Another drawback is that on some documents valid text is ignored because of its proximity to image fragments.

The second approach initially segments the document into large regions by vertical and horizontal smearing and then attempts to classify these regions as text or image by using statistical attributes of the region size and internal pixel distribution. This technique requires more computation than the first, but because the algorithm is fairly regular, a faster hardware implementation is possible. There are three main drawbacks to this method. First, if a text area and an image area on a document overlap (or in some cases are just in close proximity to each other), they will be identified as one block, thus creating a classification error for a potentially large portion of the document. Second, sometimes the statistical attributes of a region are misleading, again causing a classification error. Third, text completely surrounded by image regions may be called image. Despite these drawbacks, this technique works well over a large variety of documents.

SUMMARY OF THE INVENTION

The improved image filtering technique provides digital hardware to extract useful features from the incoming serial video and software to collect and regionalize these features. The general technique is to place an imaginary grid over the entire digitized document and make a preliminary decision by feature and pixel analysis as to whether each square in the grid is text or image. Larger text and image regions are then formed out of these smaller squares using neighborhood integration, region growing, and adaptive thresholding. The image regions are then erased and the remaining video is passed along to the character recognition process. In addition to making accurate text/image determinations, this new process uses minimal memory, provides fast throughput, and produces low numbers of image fragments.

BRIEF DESCRIPTION OF THE DRAWINGS

FIGS. 1A and 1B depict a representation of a sample text document.

DETAILED DESCRIPTION OF THE DRAWINGS

To better explain the hardware portion of the image/-text filter, the statistical attributes of rasterized text need to be understood. The video stream that enters the filter hardware can be thought of as alternating streams of black and white pixels. These streams will be called black and white runlengths.

Figure 2:
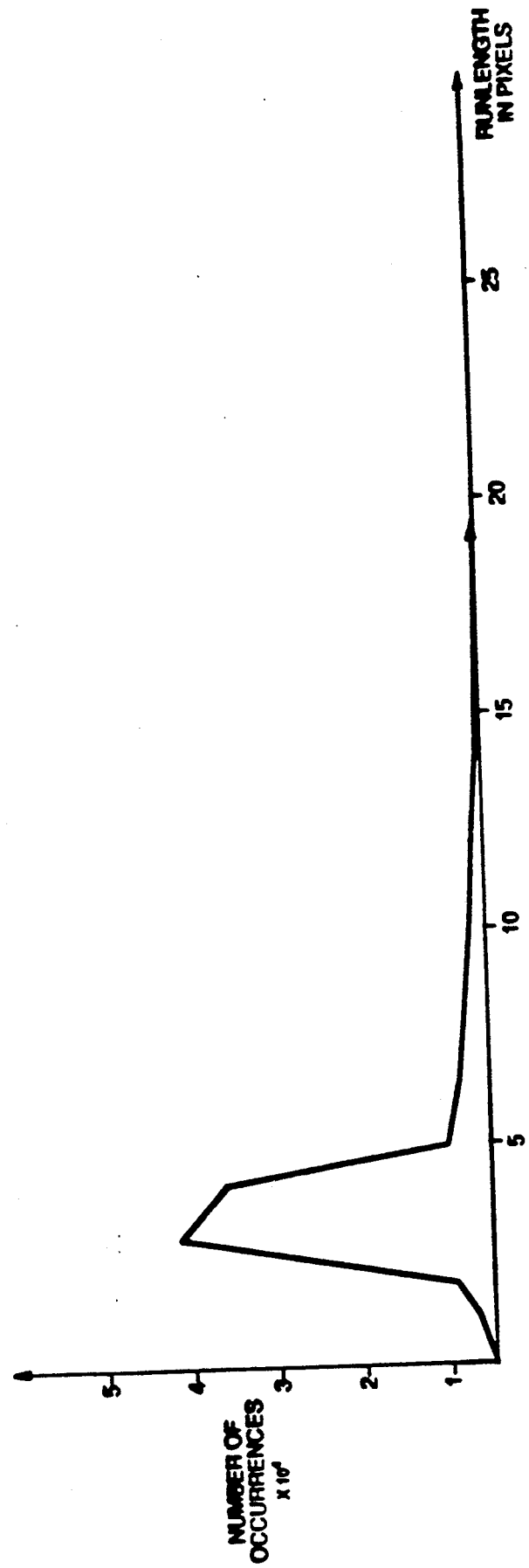
FIG. 2 depicts a histogram of the black runlength values of FIG. 1.
Figure 3:
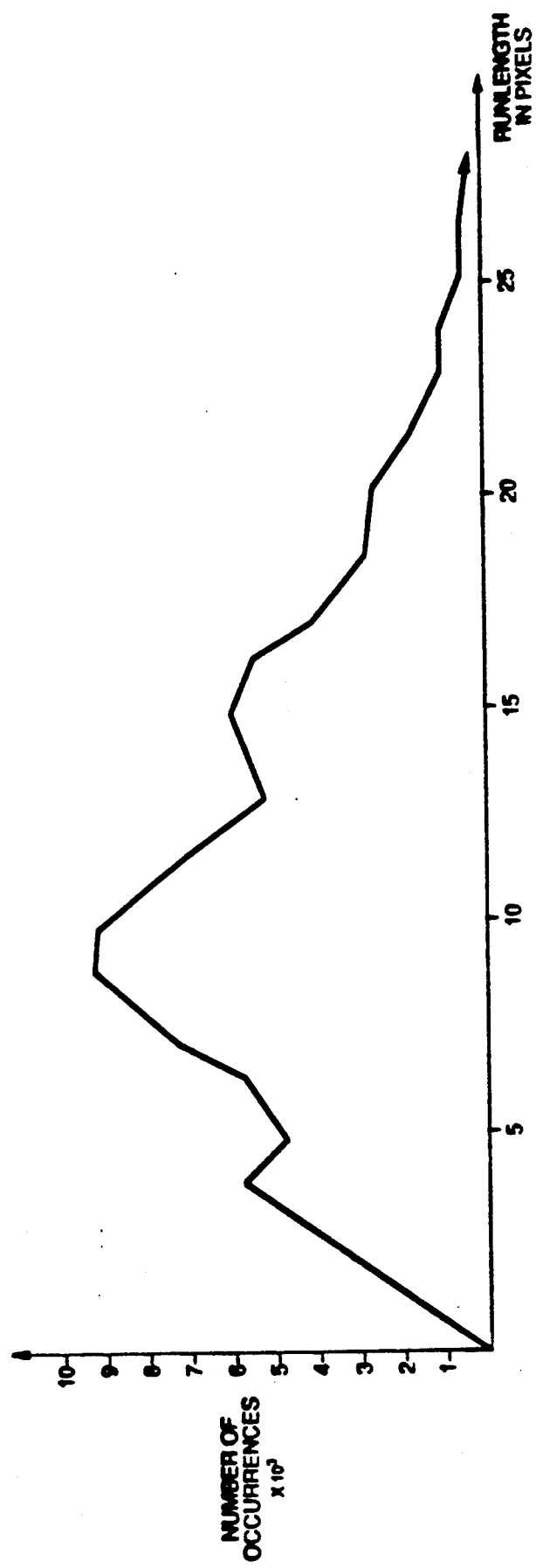
FIG. 3 depicts a histogram of the white runlength values of FIG. 1.

Typed text characters between the height ranges 8 and 12 points (1 point=1/72 inch) exhibit farily consistent statistical distributions of black and white runlengths. When scanned at 240 dots per inch (dpi), a text document will exhibit a very large number of short black runlengths and a very small number of short black runlengths larger than 16 pixels. FIG. 1 contains a sample text document that was digitized and analyzed. FIG. 2 is the resulting histogram plot of the frequency of occurrence of the black runlength values. The large peak around black runlengths of 3-4 pixels indicates that some image/text discrimination could be achieved by locating regions on a document that have a high concentration of black runlengths that are approximately 3 pixels long. In a similar way, the white runlengths found in text regions also have consistent statistical patterns. FIG. 3 is the white runlength histogram plot derived from FIG. 1. This plot indicates that the white runlengths have a larger variance than the black runlengths and should be considered of lesser value for filtering purposes.

The hardware portion of the filter extracts horizontal pixel runlength information from the incoming video. This video is a serial data stream of the rasterized document sampled at 240 pixels per inch. Each horizontal line of video contains 2048 pixels or approximately 8.53 inches of data. The hardware divides every video line into 64 groups of 32 pixels each and measures quantities called the activity count and text rating within each group. The activity count is the number of runlengths that terminate within the given 32 pixel window. The text rating is expressed by the following equation:

Text Rating = summation of (f (black runlengths) + g (white runlength)) for all the runlengths terminating within the given 32 pixel window.

The transfer functions f (black runlength) and g (white runlength) are based upon the histogram plots of runlengths obtained from sample documents and filter performance refinements. These transfer functions are implemented as look-up tables in the hardware; they convert 5-bit runlengths into 4-bit text ratings. These conversion values are listed in Table I.

TABLE I

| Runlength | Black Text Rating | White Text Rating |
|---|---|---|
| 0 | 0 | 0 |
| 1 | 1 | 1 |
| 2 | 4 | 1 |
| 3 | 8 | 1 |
| 4 | 8 | 2 |
| 5 | 7 | 2 |
| 6 | 4 | 2 |
| 7 | 2 | 2 |
| 8 | 1 | 3 |
| 9 | 1 | 3 |
| 10 | 1 | 3 |
| 11 | 1 | 3 |
| 12 | 1 | 3 |
| 13 | 1 | 2 |
| 14 | 1 | 2 |
| 15 | 0 | 2 |
| 16 | 0 | 2 |
| 17 | 0 | 2 |
| 18 | 0 | 1 |
| 19 | 0 | 1 |
| 20 | 0 | 1 |
| 21 | 0 | 1 |
| 22 | 0 | 1 |
| 23 | 0 | 1 |
| 24 | 0 | 0 |
| 25 | 0 | 0 |
| 26 | 0 | 0 |
| 27 | 0 | 0 |
| 28 | 0 | 0 |
| 29 | 0 | 0 |
| 30 | 0 | 0 |
| 31 | 0 | 1 |

Figure 4:
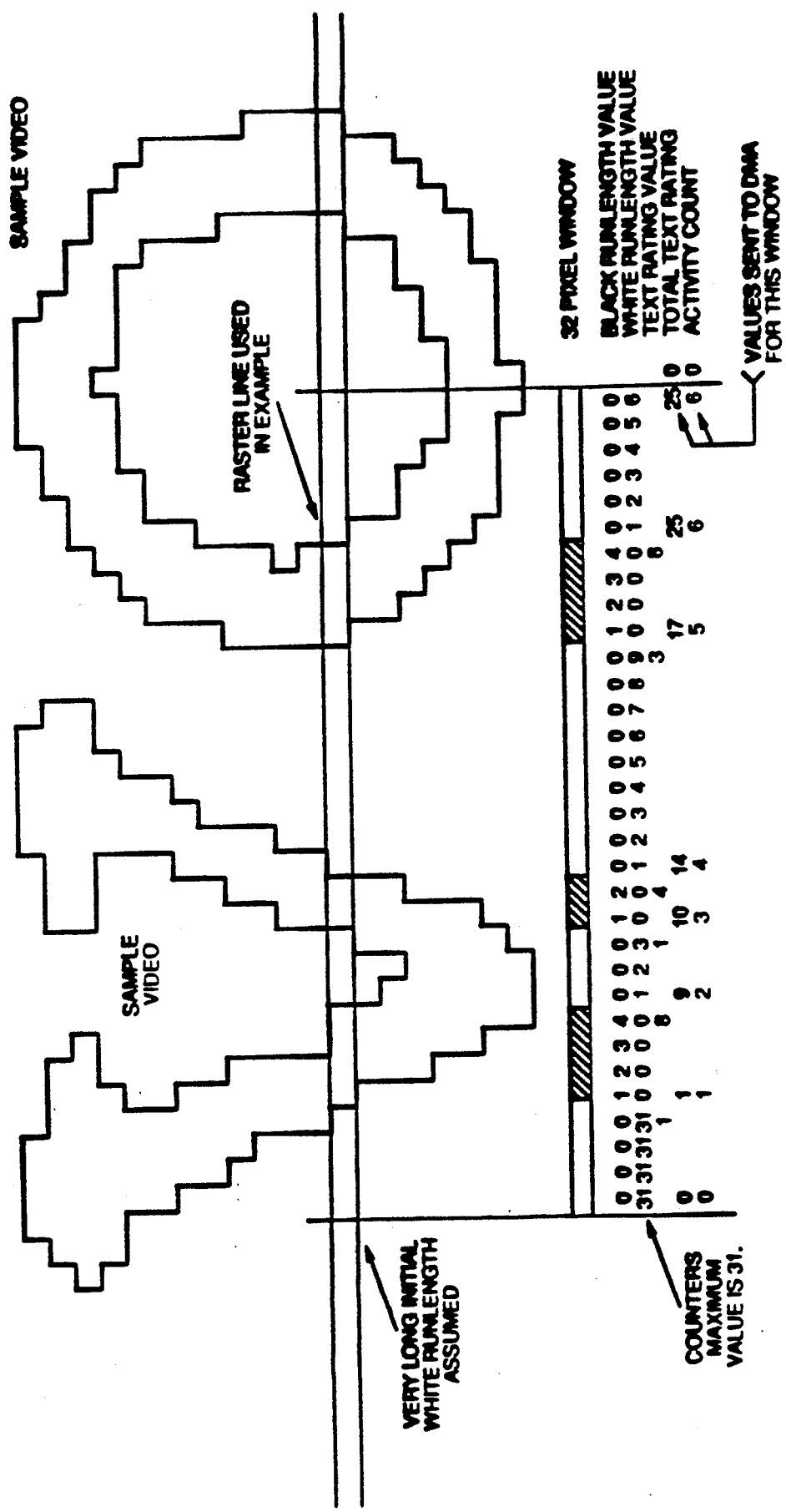
FIG. 4 depicts sample calculations for the activity counts and text ratings for the digitized letters "VO".

The text ratings for the white runlengths are lower than text ratings of black runlengths because the distribution of black runlengths contains more significant information. FIG. 4 shows sample calculations for the activity counts and text ratings in a 32 pixel window of the digitized letters "VO".

Figure 5:
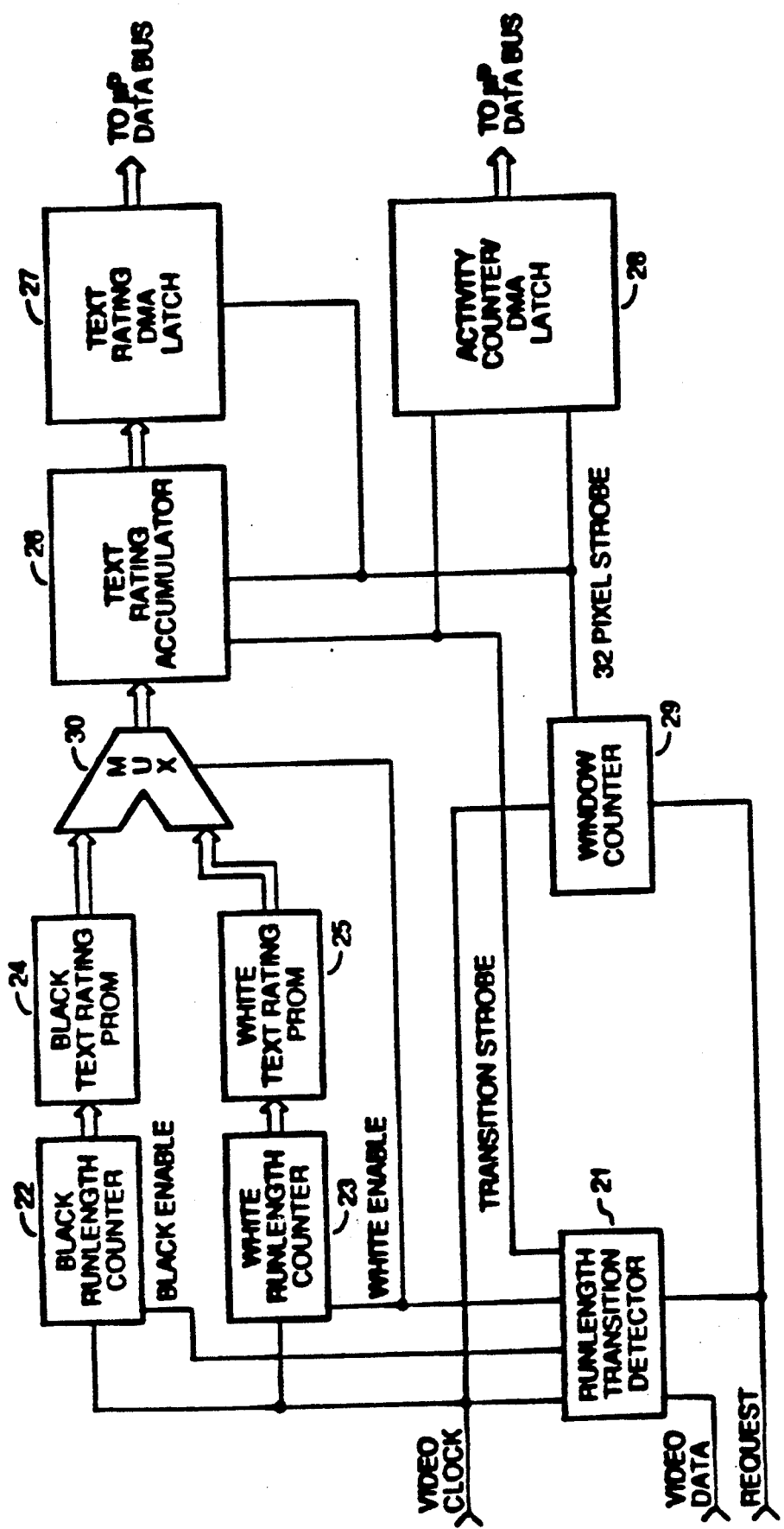
FIG. 5 depicts a block diagram of the hardware for the present invention.

A block diagram of the hardware needed to compute activity counts and text ratings is shown in FIG. 5. Signal flow starts at the left with the input video and clock; and then moves to the right where the final text rating and activity count values are presented to the microprocessor bus for direct memory access (DMA). The function of each block is listed below.

Runlength Transition Detector 21—this logic determines when the input video has switched from black to white or white to black and enables the appropriate runlength counter. In addition, it generates strobes to the Text Rating Accumulator 26 and Activity Counter 28 whenever a transition in the video level is detected.

Black Runlength Counter 22—Counter 22 counts the number of consecutive black pixels in the video data stream. The counter 22 is 5 bits wide and stops counting when it reaches the value 31. When not enabled, this counter is reset to zero.

White Runlength Counter 23—this block 23 counts the number of consecutive white pixels in the video data stream. Counter 23 is 5 bits wide and stops counting when it reaches the value 31. When not enabled, this counter 23 is reset to zero.

Black Text Rating PROM 24—this PROM 24 contains the look-up table for converting black runlengths into text ratings. Text ratings can range from zero (very image like) to eight (very text like).

White Text Rating PROM 25—this PROM 25 contains the look-up table for converting white runlengths into text ratings. Text ratings can range from zero (very image like) to three (very text like).

Text Rating Accumulator 26—at every video transition the contents of the currently enabled PROM 24 or 25 is added to an 8-bit running total through MUX 30. This total is transferred to the Text Rating DMA Latch 27 and cleared every 32 pixels.

Text Rating DMA Latch 27—this latch 27 takes the accumulated text ratings of a 32 pixel window and holds that value until the DMA channel can transfer it to memory.

Activity Counter/DMA Latch 28—this block 28 counts the number of runlength transitions that have occurred in the current 32-pixel window. Every 32 pixels this value is latched for DMA processing and cleared.

Window Counter 29—this block 29 generates a strobe every 32 video pixels that fixes text ratings and activity counts as well as triggers the DMA channel.

The image/text filter according to the present invention was implemented in a hardware environment where one DMA channel places 240 dpi video into memory while a second channel places text ratings and activity counts into a different part of memory. In order to make convenient sized data structures, 16 lines of video are acquired at a time. To reduce computations, the 16 lines of accompanying activity counts are summed into an array of 64 bytes. The same is done with the text ratings. Care is taken so that neither text ratings nor activity counts can overflow past the value 255. The resulting data structures quantize the input document into tiles ("squares") 16 pixels (0.0667 inches) tall and 32 pixels (0.133 inches) wide. This tessalation process determines the horizontal format for the arrays of video data, text ratings and activity counts.

In order to minimize memory usage, a circular buffer format was chosen for these three data structures. For example, the video array is divided into four groups of 16 lines of data. Each group is identified by a pointer: top, second, third, bottom. These four groups of video can be thought of as a horizontal window moving down the document with new video coming in at the bottom and filtered video leaving the top. Input video is entered in memory where the bottom group pointer is set. While these 16 lines of video are being acquired, the second group of files from the top are being rated as to whether they are likely to be text or image. This rating process utilizes the upper three groups (48 lines) of pixel data as well as their corresponding text rating and activity count arrays. When this process is completed and all the new video is entered, the top 16 lines of video array go through an additional rating process. This last process makes the final determination of which tiles are image and which are text. The image tiles are then erased and the resulting video passed on to the recognition process. Instead of scrolling the entire video buffer upward, only the pointers are scrolled, accomplishing the same purpose without wasting processor time by moving large blocks of memory. The section of memory that was used for the final filtered video is now pointed to by the bottom group pointer and will be overwritten with new video. For each group of 16 video lines there is a matching Text Ratings and Activity Counts array. The four groups of Text Ratings and the four groups of Activity Counts scroll in unison with the video array.

The last major data structure used by the image/text filter is the Final Ratings array. It also has a circular buffer format and scrolls in unison with the video array. This structure has three groups and contains the results of the tests performed on the video, text ratings, and activity counts arrays. The bottom group contains the preliminary tile rating codes derived from the second group of the pixel and attribute arrays. The middle group is used to compute the final tile ratings of the video sent to the recognition process. The top group contains the final tile ratings (white space, image, or text) of the previous line sent to the recognition process.

The preliminary rating of a tile by the image/text filter is performed by analyzing the pixel structures and average text ratings in the immediate neighborhood around and including the given tile. The analysis is always done on the tiles contained in the second group of the pixel and attribute arrays in order that the tile being rated is at the center of the tile region under analysis. The result of this preliminary rating is a number that is saved in the bottom group of the Final Ratings array. A list of these numbers and their meanings is included in Table II.

TABLE II

| Preliminary Rating Code | Meaning |
| --- | --- |
| 0 | White space - definitely not text |
| 1 | Too tall for text |
| 2 | Low activity or low average text rating |
| 3 | Not line oriented |
| 4 | (not used) |
| 5 | Excessive runlength activity for text |
| 6 | Medium confidence text |
| 7 | High confidence text |

The initial test performed on a given tile are pixel tests. If any of these tests reveal that the tile or the neighborhood are not "text-like," than the rating process for that tile is finished. The first test checks whether the tile has no black pixels. If that is the case, then the tile cannot be text and the rating process is completed. The next test performed is the vertical height test. This test measures the tallest feature present in the tile and its vertical neighbors (48 lines total). If there is a feature taller than the largest text character expected, then the top 32 lines (32 pixels wide) are erased immediately and the center tile rated as too tall (this erasure of the top two tiles is effective in eliminating vertical form lines). The next test performed is the runlength activity test. This test is particularly useful in identifying images such as photographs that have been created with a halftone dithering process. The small dots that create the picture form an unusually large number of runlengths per unit area; this is totally unlike text. If that test is passed, the next (and last) pixel test checks for groups of long white runlengths directly above, during or below the present tile. This test is designed to measure the "lineness" of the pixel data.

If the tile under consideration passes all of the pixel tests, then it is a candidate for local area integration. In local area integration, the text ratings of the present tile and its eight neighbors are summed and divided by the sum of the activity counts for the tile and the eight neighbors. The result is a number that is a very good indicator of whether the center tile is in a text region. That number is catagorized into one of three groups (image, medium confidence text, or high confidence text) and saved in the Final Ratings array. It should be noted that if the tile and its eight neighbors have a low net activity count, then the tile is assumed to contain pixel noise and not text.

Preliminary text ratings are finalized when the tiles in the second group of the Final Ratings array are scrolled to the first group. The purpose of this final analysis is to "homogenize" text and image regions by region growing. If a region consists mostly of tiles with a text rating, this process will change the rating of any interspersed image tiles to text. Likewise, if a region consists mostly of tiles with an image rating, this process will change the rating of any interspersed text tiles to image. A given tile is rated with consideration of the two tiles to the left, the two tiles to the right, and the final rating of the tile directly above. This concept is called adaptive vertical thresholding. If the above tile was white space or text, then the five tiles under consideration must have a medium confidence aggregate text rating for the center tile to be called text. If the above tile was determined to be image, then the five tiles under consideration must have a high confidence aggregate text rating for the center tile to be called text. The technique used to compute the aggregate text ratings of the center tile and its four horizontal neighbors is based on a look-up table. The final rating for a tile is determined from this table, and if image, the pixel data in the video array corresponding to the position of the present tile is erased.

The filtering technique of building image and text regions from the statistical characteristics of small tiles of pixels proved quite adaptable to a microprocessor based environment. The design goals of low text loss, high image rejection, and fast throughput were all successfully met in an implementation that required relatively little external hardware compared to image processing systems currently available.

The image/text filter described was implemented as a video preprocessor to applicant's OCR technology. Interaction between the filter and character isolation/recognition was purposely kept to a minimum. The flexibility of future filter designs could be greatly enhanced by integrating the described statistical techniques directly with the character isolation process. Advantages would include better separation of adjacent image/text regions and faster throughput due to the elimination of redundant pixel texts.

A copy of a software listing suitable for controlling the operation of the hardware illustrated in FIG. 5 is illustrated in Appendix A.

What is claimed is:

1. In an optical character recognition system, image/text filtering apparatus for filtering video data representing images and text on a document, said apparatus comprising means for processing said video data on a grid type basis where said grid is in the form of a plurality of squares overlaying said document, wherein said video data includes streams of black and white pixels in the form of black and white runlengths, said means for processing including means for determing transitions between said black and white runlengths and means for counting said transitions, said means for processing further including means for determining whether the video data within each of said squares is a text region or an image region wherein said means for determining utilizes said transition counts and a series of pixel tests, including means for counting the number of pixels in black runlenghts and white runlengths, respectively, memory means addressable by the count in said respective counting means for converting said respective black and white runlengths into text ratings, means for accumulating and storing the current text ratings until the determination of text or image is completed, and means for erasing said image region so that only the text region remains as the video data.

2. The apparatus of claim 1 wherein said series of pixel tests includes means for determining whether each of said squares includes any black pixels.

3. The apparatus of claim 2 wherein said series of pixel tests include means for measuring the tallest feature within the squares under test.

4. The apparatus of claim 3 wherein said series of pixel tests include means for determining the number of runlengths per unit area.

5. The apparatus of claim 4 wherein said series of pixel tests include means for comparing white runlength counts of a predetermined number above, during and below the square under test in order to measure whether the pixel data is in the form of a line on the document.

6. The apparatus as in claim 5 wherein said series of pixel tests include means for integrating the text ratings of the square under test together with its adjacent squares.

7. The apparatus of claim 6 wherein said series of pixel tests include means for rating the square under test with the two squares to its left, the two squares to its right, and the square directly above, to achieve adaptive vertical thresholding.

8. In an optical character recognition system having image/text filtering apparatus for filtering video data representing images and text on a document, the method comprising the steps of processing said video data on a grid type basis where said grid is in the form of a plurality of squares overlaying said document, wherein said video data includes streams of black and white pixels in the form of black and white runlengths, said processing step further including the steps of determining transitions between said black and white runlengths, counting said transitions, determining whether the video data within each of said squares is a text region or an image region wherein said determining step utilizes said transition counts and a series of pixel tests, further including the steps of counting the number of pixels in black runlengths and white runlengths, respectively, converting said respective black and white runlengths into text ratings, accumulating and storing the current text ratings until the determination of text or image is completed, and erasing said image region so that only the text region remains as the video data.

* * * * *